(12) United States Patent
Waldstädt et al.

(10) Patent No.: US 7,828,638 B2
(45) Date of Patent: Nov. 9, 2010

(54) SCREW CONVEYOR SECTIONS

(75) Inventors: Manfred Waldstädt, Mainz (DE);
Günter Kessler, Frankfurt am Main (DE)

(73) Assignee: Poly-Clip System GmbH & Co. KG, Frankfurt am Main (DE)

( * ) Notice: Subject to any disclaimer, the term of this patent is extended or adjusted under 35 U.S.C. 154(b) by 0 days.

(21) Appl. No.: 12/408,113

(22) Filed: Mar. 20, 2009

(65) Prior Publication Data
US 2009/0227190 A1    Sep. 10, 2009

(30) Foreign Application Priority Data
Mar. 20, 2008  (DE) .................... 10 2008 015 266
Aug. 14, 2008  (EP) .................... 08014530

(51) Int. Cl.
*A22B 7/00*    (2006.01)
(52) U.S. Cl. .................................. 452/177
(58) Field of Classification Search ......... 198/657–660; 452/177–184
See application file for complete search history.

(56) References Cited

U.S. PATENT DOCUMENTS

| | | | | |
|---|---|---|---|---|
| 2,830,695 A | * | 4/1958 | Fennimore et al. | 198/659 |
| 4,547,931 A | | 10/1985 | Staudenrausch et al. | |
| 4,993,539 A | * | 2/1991 | Duce | 198/659 |
| 5,230,419 A | * | 7/1993 | Millard | 198/668 |
| 5,699,897 A | * | 12/1997 | Svejkovsky | 198/750.8 |
| 6,261,050 B1 | * | 7/2001 | Kuhns | 414/526 |
| 6,283,275 B1 | * | 9/2001 | Morris et al. | 198/677 |
| 2005/0042979 A1 | | 2/2005 | Sames | |
| 2008/0064313 A1 | | 3/2008 | Topfer | |

FOREIGN PATENT DOCUMENTS

| | | |
|---|---|---|
| EP | 0 647 577 A2 | 11/1994 |
| EP | 0 802 133 A2 | 10/1997 |
| EP | 1 518 461 A2 | 3/2005 |
| FR | 1319339 | 1/1963 |
| WO | 95/21116 A1 | 8/1995 |

OTHER PUBLICATIONS

EP 08 01 4530 Search Report dated Mar. 31, 2009.

* cited by examiner

*Primary Examiner*—Thomas Price
(74) *Attorney, Agent, or Firm*—Louis F. Wagner; Hahn Loeser + Parks LLP

(57) ABSTRACT

A transport device having a screw conveyor for transporting products hanging on loops, in particular for transporting sausage products, the transport device includes a first screw conveyor section, a drive for the first screw conveyor section, wherein the drive torque is transferred to the screw conveyor section via an outer circumferential area of the first screw conveyor section, and further includes a first bearing assembly for the first screw conveyor section, wherein a second screw conveyor section that immediately adjoins the first screw conveyor section in the direction of transport is provided.

24 Claims, 4 Drawing Sheets

SCREW CONVEYOR SECTIONS

BACKGROUND OF THE INVENTION

The invention relates to a transport device. In particular, the invention relates to a transport device having a screw conveyor for transporting products hanging on loops or the like, in particular for transporting sausage products. The transport device comprises a first screw conveyor section, a drive means for the first screw conveyor section, where the drive torque is transferred to the screw conveyor section via an outer circumferential area of the first screw conveyor section, and further comprises a first bearing device for the first screw conveyor section.

It is known, in practice, that when producing sausages, for example, the sausage meat is fed by a filling machine to a clipping machine via a filling tube. In the clipping machine, the filling material is filled into a tubular packaging material, which is closed at one end by a first clip, and the tubular packaging material is closed by placing a second clip. If the sausage-shaped product or the sausage product is to be suspended for further processing, a suspension element, which in most cases is a thread loop, is usually inserted into the second clip and fixed to the sausage product by means of said second clip. The sausage products are then transported out of the clipping machine by means of a transport device and are strung on storage rods in order to be further processed, for example smoked.

A transport device of the kind initially specified is known from the laid-open German patent application DE 103 32 329 A1 (US 20050042979). This known transport device for transporting objects suspended on loops has a shaft with a worm disposed on its outer surface. The shaft is supported by three bearing rollers uniformly distributed around the circumference of the shaft, wherein one of said rollers transfers a drive torque to the shaft. In the profile formed by the worm, the products hanging from the loops encircling the shaft are transported along the linear transport path formed by the shaft.

However, objects hanging on loops can be transported by means of the known transport device only linearly and in a horizontal direction. This makes it difficult to connect the known transport device to upstream or downstream machines and devices, or limits such connections, because the respective infeed and discharge devices of such machines must be matched to the height of the transport device.

SUMMARY OF THE INVENTION

An object of the present invention is therefore to provide a transport device of the kind initially specified that makes the transport of objects hanging on loops more flexible and which facilitates the connection of upstream or downstream devices.

What is proposed is a transport device having a screw conveyor for transporting products hanging on loops or the like, in particular for transporting sausage products. The transport device has a first screw conveyor section and a drive means for the first screw conveyor section. The drive torque is transferred to the first screw conveyor section via the outer circumferential area thereof. The transport device also has a first bearing assembly for the first screw conveyor section. In a preferred embodiment of the invention, a second screw conveyor section is provided that immediately adjoins the first screw conveyor section in the direction of transport. It is possible by this means for the length of the transport device to be varied, thus allowing the linkage to upstream or downstream devices to be designed in a more flexible manner, hence permitting further facilitation of such linkage. It is possible at the same time to limit the length of the individual screw conveyor sections.

In one preferred embodiment, the first screw conveyor section and/or the second screw conveyor section is embodied as a hollow shaft to enable a rigid axis, used for example for fixing feed and discharge guides to the face ends of the screw conveyor section, to be guided through the device.

In one preferred design, the right-hand end of the second screw conveyor section is inserted into the left-hand end of the first screw conveyor section. This results in a gapless transition from the first to the second screw conveyor section, as a result of which it is possible to ensure smooth onward transport of the products suspended therefrom.

When the central longitudinal axis of the second screw conveyor section opposite has an angular deviation with respect to the central longitudinal axis of the first screw conveyor section, a change in the transport path can be achieved not only in the infeed or discharge heights, but also with respect to the direction of transport.

To achieve a smooth transition from the first screw conveyor section onto the second screw conveyor section, the angular deviation of the central longitudinal axis of the second screw conveyor section is less than 90° from the central longitudinal axis of the first screw conveyor section.

When the central longitudinal axes of the first and the second screw conveyor sections are arranged in an at least approximately vertical plane, two successive machines with different infeed and discharge height can be coupled by means of the transport device according to the invention in a particularly simple manner.

The angular deviation may be in any direction different to the direction predefined by the central longitudinal axis of the first screw conveyor section. The transport path can therefore change direction in both the horizontal and in the vertical direction.

In another advantageous configuration, the first screw conveyor section has a second bearing assembly in order to ensure that the first screw conveyor section is reliably supported. Providing a second bearing assembly likewise allows the axial length of the first screw conveyor section to be extended without destabilizing it.

When the second screw conveyor section is guided by the first screw conveyor section at the connecting point thereto, it may suffice for mounting the second screw conveyor section if the latter has at least one bearing assembly.

The bearing assemblies of the first and of the second screw conveyor sections may be formed in various ways. In one preferred configuration, they are each formed by three support wheels which are preferably arranged at a uniform distance from each other in the circumferential direction of the screw conveyor sections. It is advantageous to arrange two of the support wheels symmetrically underneath the shaft and the third centrically above the shaft. On the one hand, this measure ensures that the shaft is reliably supported. On the other hand, an uninterrupted transport path for the products suspended on loops or the like is provided on the screw conveyor sections thus mounted, in that during transport the loops are guided between the two support wheels that are arranged symmetrically underneath the shaft and form a gap.

To ensure smooth and continuous transport of the products suspended on loops, it is also advantageous when the second screw conveyor section can be driven. The second screw conveyor section should also be capable of being driven in synchrony with the first screw conveyor section, in order to prevent accumulation and congestion of the transported products at the transition between the first and the second screw conveyor sections.

In order that the two screw conveyor sections can be driven at the same speed, the first and the second screw conveyor sections can be driven, in one preferred configuration, by a shared drive means, which may preferably take the form of the drive means of the first screw conveyor section.

In this configuration, the drive torque is transferred to the first and to the second screw conveyor sections by a respective support wheel. This measure achieves a simpler structure by integrating the drive means into the bearing of the screw conveyor section, with the result that no drive devices need to be provided in addition to the bearing.

Transfer of the drive torque by the respective support wheel can thus be achieved in various ways. If the driving support wheel is in positive engagement with the first and second screw conveyor sections, respectively, non-slip transfer of the drive torque can be ensured. This can be realized by the support wheels and corresponding portion of the screw conveyor section having matching toothing.

If, in contrast, each one support wheel is in frictional engagement with the first and second screw conveyor section, respectively, a surface that can be more simply designed and which promotes frictional engagement will suffice. This surface may be formed, for example, by roughening or by means of a gummed overlay.

To achieve identical transport speeds of the two screw conveyor sections, it is advantageous if the support wheels are connected by a Cardin shaft for synchronous transfer of the drive torque.

Providing bearings for the screw conveyor sections in the form of the support wheels is sufficient for spatially arranging the at least two screw conveyor sections relative to each another. However, axial securing means should be provided to prevent the screw conveyor sections from being displaced along their central longitudinal axes. In one preferred configuration of the inventive transport device, the first and the second screw conveyor sections are disposed rotatably and coaxially on a first and a second axle section, respectively. In this regard, the specific design of the bearings or bearing seats between the screw conveyor sections and the axle sections may suffice as axial securing means.

The axial securing means may be further improved and/or simplified by fixedly connecting the first and the second axle sections to each other by means of a transition piece. By means of such a transition piece, the angular deviation of the central longitudinal axis of the second screw conveyor section from the central longitudinal axis of the first screw conveyor section is also defined, on the one hand. On the other hand, the angular deviation of the central longitudinal axis can be altered in a relatively simple manner by replacing said transition piece with another.

To facilitate the feeding and/or discharging of the loops onto and off the transport device, feed and discharge guides for the loops are provided at the infeed and discharge ends of the transport device. By this means, the inventive transport device can be positioned downstream as a discharge section of a clipping machine, for example.

In one preferred configuration of the transport device, a run-out for the product suspended on loops is disposed in the region of the first screw conveyor section. The run-out may have a drivable conveyor belt. The run-out may also contain a first horizontally oriented section and a second section sloping downward in the direction of transport. Such a run-out enables reliable and damage-free discharge of the sausage products from the clipping machine.

It is also advantageous when the length of the first section and the inclination of the second section of the conveyor belt can be adjusted in order to adapt the run-out to the length and/or the caliber of the sausage product.

Normally, the run-out is fixedly connected to the machine frame of the transport device. Alternatively, however, an articulated joint may be provided where the run-out is connected to the machine frame, by means of which articulated joint the run-out can be pivoted in the horizontal plane relative to the first screw conveyor section. By this means, installation and maintenance work can be facilitated by improved access to the clipping machine. In this regard, it is also advantageous if the clipping-machine end of the run-out can be pivoted away from the clipping machine exit.

Other advantageous configurations and an embodiment of the invention shall now be described with reference to the description of an embodiment and to the attached drawings. The terms "top", "bottom", "left" and "right" used when describing the embodiment relate to the drawings oriented in such a way that the reference numerals and names of the figures can be read normally, in which:

DETAILED DESCRIPTION OF THE DRAWINGS

Figure 1:
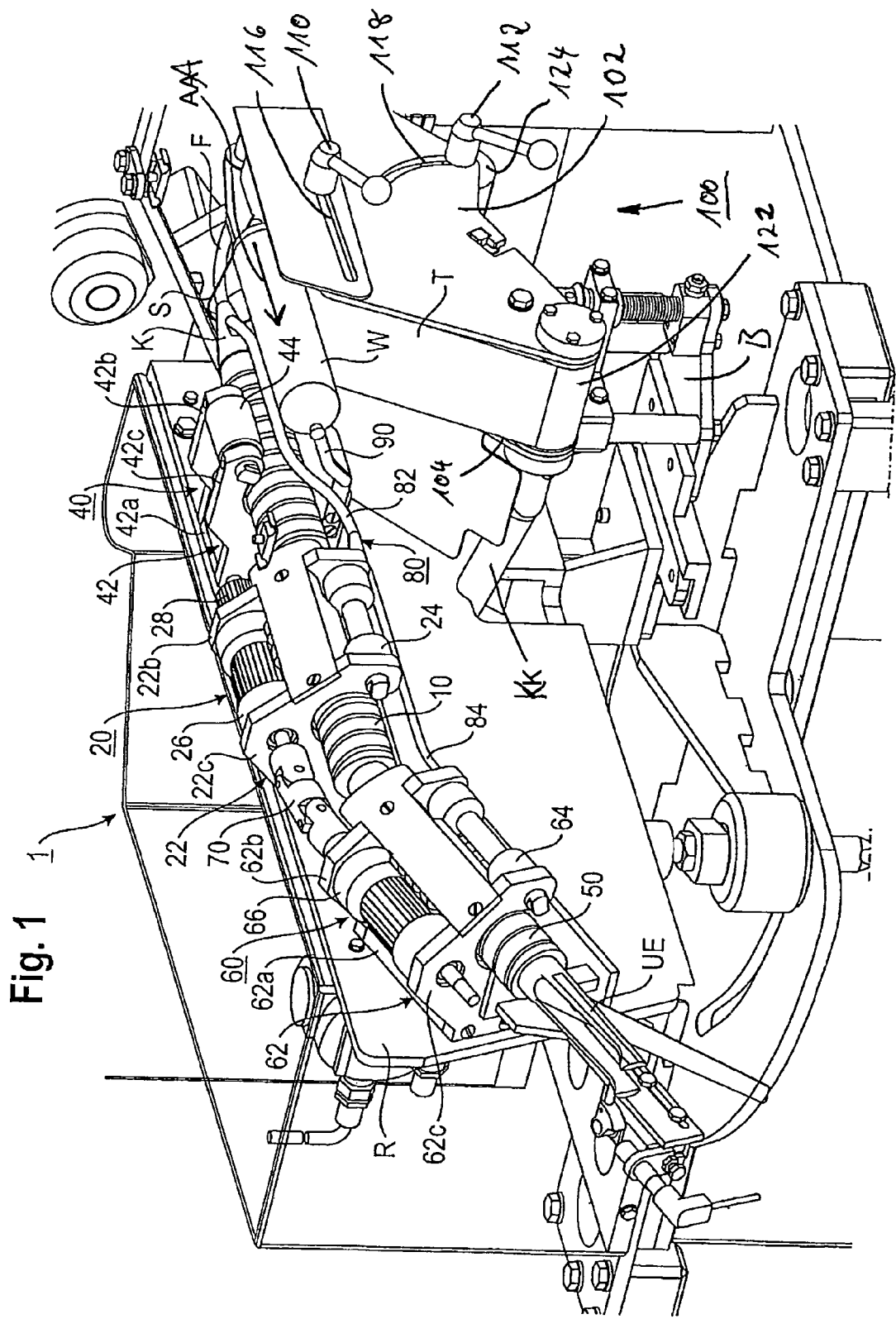
FIG. 1 shows a perspective view of the inventive transport device in the installed state.

FIG. 1 shows an embodiment of the inventive transport device installed in a sausage clipping machine. The transport device is used here as a discharge section 1 of the clipping machine (not shown in any further detail) for the sausage products W that are produced in said machine.

Figure 2:
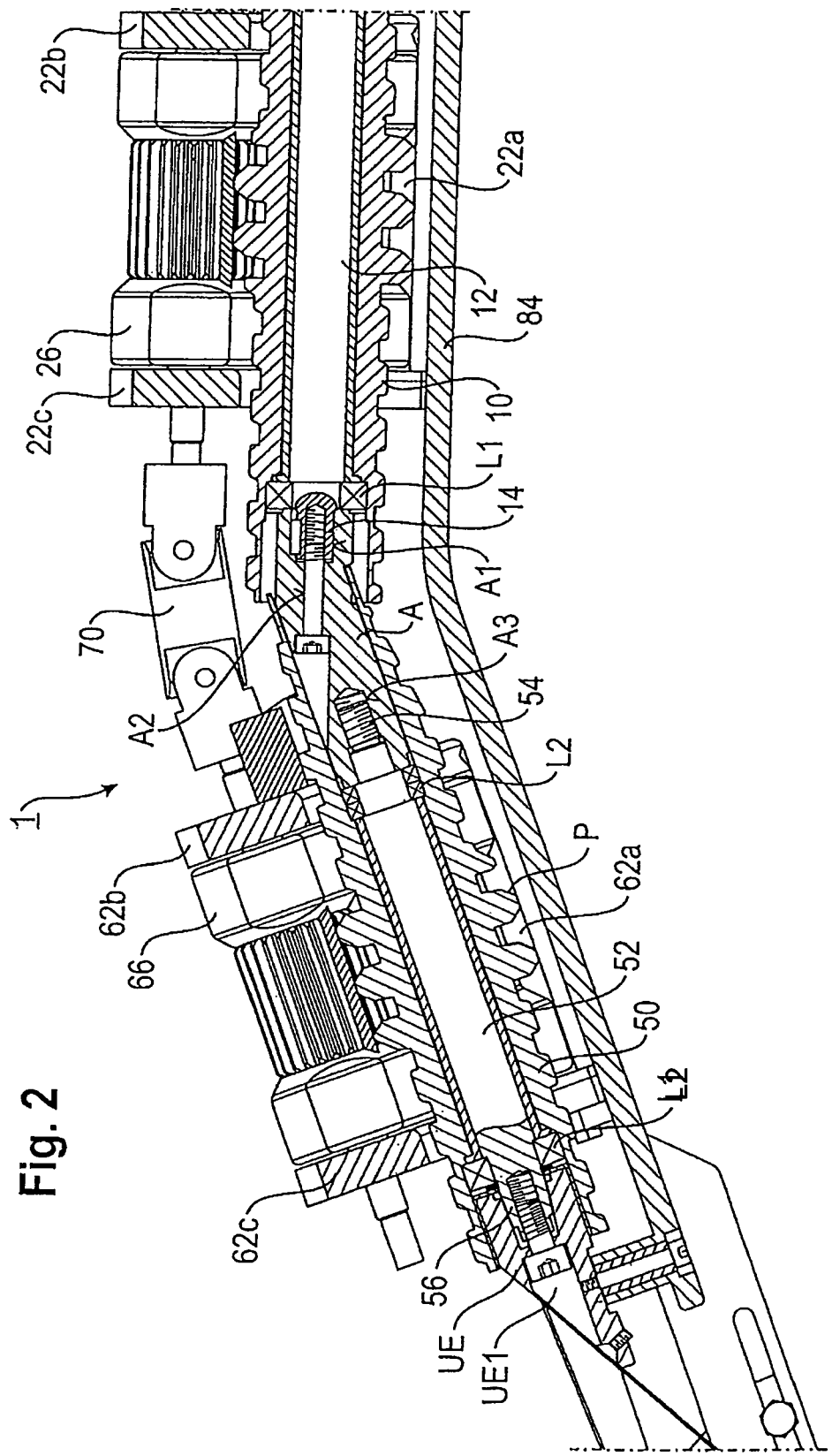
FIG. 2 shows a sectional view of part of the inventive transport device.

Discharge section 1 shown in FIG. 1 has a first hollow cylindrical screw conveyor section 10. The first screw conveyor section 10 is mounted in the region of its ends in a first bearing unit 20 and in a second bearing unit 40, which are fixed to a vertical section of a machine frame R. First screw conveyor section 10 is oriented substantially horizontally and parallel with respect to machine frame R. First screw conveyor section 10 has the form of a hollow cylinder with a profile P extending along its surface, this profile is configured as a worm profile or trapezoidal thread (as also shown in FIG. 2). It may be made of any suitable metal, and preferably of stainless steel.

The right-hand end of the first screw conveyor section 10, in FIG. 1, points in the direction of the clipping machine. In order to slip the suspension element of sausage product W, provided here in the form of a loop S, reliably onto the first screw conveyor section 10, a feed guide is disposed in the form of a guide cone K at the right-hand end of the first screw conveyor section. The outer diameter of guide cone K at the screw conveyor end matches the outer diameter of the first screw conveyor section 10. The tapering end of guide cone K at the clipping machine end transitions into a catching device F for catching loop S. The right-hand end of catching device F extends directly into the region of the closing tools of the clipping machine and picks up loops S directly while they are being attached to the sausage product W.

The two bearing units 20, 40 of the first screw conveyor section 10 are spaced apart from each other in the direction of transport in such a way that, in the direction of transport, the second bearing unit 40 is provided first, before the first bearing unit 20 is provided. If the first screw conveyor section 10 has only a small axial length, it may not be necessary in some circumstances to provide the second bearing unit 40.

The two bearing units 20, 40 for the first screw conveyor section 10 each have a substantially U-shaped support frame 22, 42 made of a suitable metal, with which bearing units are fixed onto machine frame R. Support frames 22, 42 each consist of a base part 22a, 42a which is fixed to machine frame R, and leg parts 22b, 22c, 42b, 42c, which are spaced apart from each other, fixed to base parts 22a, 42a, and are oriented perpendicular to machine frame R and perpendicular to the central longitudinal axis of screw conveyor section 10. Leg parts 22b, 22c, 42b, 42c have circular recesses that are each open to a respective peripheral section, through which recesses the first screw conveyor section 10 extends.

Bearing unit 40 also contains three support wheels 44 which are preferably arranged at a uniform distance from each other around the circumference of screw conveyor section 10. The cylindrical support wheels 44 are made of plastic, for example. They are oriented parallel to screw conveyor section 10 and are in linear contact with the latter along the surface thereof. The length of support wheels 44 is substantially equal to the clearance between the facing sides of leg parts 42b, 42c of support frame 42. Support wheels 44 are rotatably mounted by means of bolts which are fixed in leg parts 42b, 42c of support frame 42.

The first bearing unit 20, which is disposed in the region of the left-hand end of the first screw conveyor section 10, likewise has three support wheels 24, 26 preferably arranged at a uniform distance from each other around the circumference of screw conveyor section 10. The substantially cylindrical support wheels 24, of which only one is shown in FIG. 1, are symmetrically arranged underneath screw conveyor section 10, forming a gap along which loops S can be guided during the transport operation through bearing unit 20. They are fixed in the same manner as the support wheels 44 of the second bearing unit 40. Unlike the latter, support wheels 24 have a cylindrical part extending across their middle section, the outer diameter of the middle section is smaller than the outer diameter of the adjoining end portions to the right and left of the cylindrical portion. The third support wheel 26 of bearing unit 20 has a larger outer diameter than the two support wheels 24. Like the two support wheels 24, it likewise has a middle portion whose outer diameter is smaller than the outer diameter of the adjoining end portions to the left and right thereof. Toothing is machined into the middle portion of support wheel 26 so that the support wheel can function as a pinion gear. The shaft on which support wheel 26 is mounted is also extended to the right beyond leg part 22b, that is, in the direction of the clipping machine. A pinion gear 28 is machined onto the extension, by means of which support wheel 26 can be driven.

The first screw conveyor section 10 has a correspondingly enlarged and approximately cylindrical diameter in the region of the reduced diameter portions of support wheels 24, 26. This enlarged diameter is provided with toothing that matches the toothing on support wheel 26. By means of said toothing, support wheel 26 and screw conveyor section 10 are in positive engagement with each other. Support wheel 26, which is driven by pinion gear 28, thus transfers the drive torque in a non-slip manner onto the first screw conveyor section 10.

As can also be seen from FIG. 1, a second screw conveyor section 50 adjoins the left-hand end of the first screw conveyor section 10. Like the first screw conveyor section 10, this second screw conveyor section is oriented parallel to machine frame R. Unlike the latter, however, the second screw conveyor section 50 slopes downward from right to left. Its right end facing the first screw conveyor section 10 is at the same height as the latter, whereas the left end of the second screw conveyor section 50 is lower.

The right-hand end of the substantially hollow cylindrical second screw conveyor section 50 is of conical shape. Its outer diameter decreases to such an extent that it is smaller than the inner diameter of the likewise hollow cylindrical first screw conveyor section 20. In this way, the right-hand end of the screw conveyor section 50 can be inserted at least partially into the left-hand end of screw conveyor section 20, in order to provide a gapless transition between the two screw conveyor sections 20, 50.

The second screw conveyor section 50 is supported by a third bearing unit 60. The latter is identical in structure to bearing unit 20, so reference is made thereto for a detailed description. The third bearing unit 60 is fixed by the base part 62a of support frame 62 to machine frame R. It has the same inclination as the second screw conveyor section 50, which is supported by support wheels 64, 66 in the manner described with reference to bearing unit 20. Third bearing unit 60 includes leg parts 62b, 62c.

Like support wheel 26 of bearing unit 20, support wheel 66 of bearing unit 60 likewise has a cylindrical middle part having a reduced diameter and provided with toothing. It is connected, via shaft 70 with a Cardin joint, to support wheel 26 of the second bearing unit 20 and can be driven at the same speed by said support wheel. The second screw conveyor section 50 likewise has a cylindrical enlargement of its diameter for drive purposes in the region of the toothing of support wheel 66, said diameter enlargement having toothing corresponding to the toothing on support wheel 66. Due to the identical design of bearing units 20, 60 and the torsionally stiff connection of the drivable support wheels 26, 66, synchronous rotational movement of the first and second screw conveyor sections 10, 50 is ensured.

On the left-hand end of the second screw conveyor section 50 facing away from the first screw conveyor section 10, a transfer element UE is provided, the right-hand cylindrical end of which on the screw conveyor section side has a diameter that is substantially equal to that of screw conveyor section 50, in order to ensure an approximately stepless transition. The right-hand end of transfer element UE is fork-shaped and forms the final part of the inventive transport device configured as discharge section 1.

A guide device 80 is also shown in FIG. 1. It essentially extends between guide cone K and transfer element UE. The first section 82 of guide device 80 has a circular cross-section. It emerges from approximately the middle of guide cone K, runs horizontally immediately beside the first screw conveyor section 10 and parallel to same in the direction of the transfer-side end. Between the first and second bearing units 20, 40, it is guided in an arc to the middle underneath the first screw conveyor section 10. Approximately from the second bearing unit 20 onwards, the first section 82 of guide device 80 transitions into a second section 84 of guide device 80. The second section 84 has an approximately rectangular cross-section with rounded edges. The width of the cross-section is approximately equal to the diameter of screw conveyor sections 10, 50. The second section 82 of guide device 80 extends underneath screw conveyor sections 10, 50 in the middle thereof and parallel thereto. It ends below the right-hand cylindrical end of transfer element UE and is fixed thereto.

FIG. 1 also shows a guide rail 90 which extends approximately from the clipping machine end of guide cone K to leg part 42c of bearing unit 40 and parallel to the first screw conveyor section 10. It extends along the opposite side of discharge section 1 from machine frame R and with a small gap underneath the first screw conveyor section 10.

The sausage clipping machine partially shown in FIG. 1 further comprises a run-out 100 for the sausage products W to be discharged from the clipping machine. Run-out 100 comprises a conveyor belt T which has a first horizontal section and an section which adjoins in the direction of discharge or transport and which slopes sharply downward. The horizontal first section of conveyor belt T is aligned approximately with the height of the lower edge of the first screw conveyor section 10 and extends thereby from the end of the clipping machine approximately as far as bearing assembly 40. A horizontally aligned first roller 120 located at this position of run-out 100, but not shown in any further detail in FIG. 1, deflects conveyor belt T downward at an angle, to where the latter is deflected around a second roller 122 counter to discharge direction AA and back to the beginning of the horizontal section. Deflection rollers 120, 122 are disposed between one left-hand and one right-hand substantially planar frame element 102, 104 which is vertically oriented in the direction of discharge, and are rotatably mounted therebetween about their horizontally oriented longitudinal axes.

Run-out 100 further comprises one first and one second adjusting handle 110, 112. With the aid of the first adjusting handle 110, the length of the first section of conveyor belt T and the gradient of the second, downwardly sloping section of conveyor belt T can be adjusted, as will later be described in greater detail with reference to FIGS. 3 and 4. For this purpose, the left-hand frame element 102 has a horizontally extending elongate hole 116, in which the horizontally oriented longitudinal axis of the first roller 120 can be reversibly displaced in discharge direction AA and fixed by the first adjusting handle 110. By means of the second adjusting handle 112, it is possible to actuate a tension roller 124 in the same manner as the first roller 120, in order to set a desired tension on conveyor belt T or, after adjusting the length of the first section and the inclination of the second, downwardly sloping section of conveyor belt T, to restore a particular tension therein. An arcuate, elongate hole 118 for reversibly displacing tension roller 124 is disposed in the left-hand frame element 102.

In the embodiment in FIG. 1, the left-hand frame element 102 has a two-part design. However, the two parts of frame element 102 are fixedly connected to each other such they function as a single component. In a further embodiment, as will be described with reference to FIGS. 3 and 4, frame element 102 consists of only one part.

As can also be seen in FIG. 1, the second roller 122 can be driven by a Cardin shaft KK. Cardin shaft KK may be connected, for example, to the drive for screw conveyor sections 10, 50 and matched in this way to their drive speed. However, a separate drive may also be provided which is matched in speed to the transport speed of screw conveyor sections 10, 50 by means of an appropriate controller.

Run-out 100 as shown in FIG. 1 is fixed to a base platform or base B by means of various fixing elements that are not described in any further detail. Base B, for its part, is fixedly connected to the machine frame of discharge section 1, such that run-out 100 adopts a fixed, defined orientation with respect to discharge section 1.

FIG. 2 shows a cross-section along a sectional plane extending through the central longitudinal axes of screw conveyor sections 10, 50 in the region of bearing units 20, 60. As can be seen from FIG. 2, the first screw conveyor section 10 is disposed coaxially on a first axle section 12 and can be rotated about the latter by means of suitable bearings L1, L2 that are not specified in any further detail. The second screw conveyor section 50 is mounted coaxially on a second axle section 52 and can likewise be rotated about the latter by means of suitable bearings L1, L2 that are not specified in any further detail. It should be noted that the bearings for the right-hand side (not shown) of the first screw conveyor section 10 may be identical to the bearings for the right-hand side of the second screw conveyor section 50.

It can also be seen that screw conveyor sections 10, 50 have a larger inner diameter in the region of their respective ends. This permits the facing ends of screw conveyor sections 10, 50 to interlock better.

In the connection region of the second screw conveyor section 50, the ends of axle sections 12, 52 are connected to each other on the first screw conveyor section 20 via a transition piece provided in the form of an adapter A. Adapter A has a circular cross-section and is provided with a bend which corresponds to the angular deviation of the central longitudinal axes of screw conveyor sections 10, 50. The right-hand end of adapter A, in FIG. 2, has a first cylindrical through bore A1, the inner diameter of which matches the outer diameter of the left-hand end portion 14 of the first axle section 12. A groove and tongue connection provides a non-rotating connection between adapter A and the first axle section 12. A screw is guided through a through bore A2, which extends coaxially to cylindrical through bore A1 in the right-hand end of adapter A, and which has a shoulder. The screw is screwed into a threaded hole extending coaxially in the left end portion 14 of the first axle section 12, thus preventing adapter A and the first axle section 12 from sliding apart.

In the left-hand end portion of adapter A, a coaxially extending threaded hole A3 is disposed, into which the second axle section 52 having an outer thread at its right-hand end 54 is screwed.

The cylindrical right-hand end of transfer element UE has a through bore UE1 and a peripheral rim positioned approximately centrically therein. Transfer element UE is attached by this end to the left-hand end 56 of the second axle section 52. A screw which is inserted through hole UE1 of transfer element UE and bolted into a matching internal thread in the left-hand end 56 of the second axle section 52 secures transfer element UE against being pulled off the second axle section 52. It can also be seen that the touching cylindrical surfaces of the second axle section 52 and transfer element UE are conical in shape, thus resulting in a frictional connection that prevents the different sections from twisting in relation to each other.

The bearing seats of bearings L1, L2 are formed by corresponding shoulders on axle sections 12, 52. The bearings are axially secured by bracing the corresponding portions of adapter A and transfer element UE against the inner bearing rings, which are not described here in any further detail.

FIG. 2 also shows the enlarged diameters of the first and second side of the first screw conveyor section 10, 50 in the region of bearing units 20, 60. It can be seen that these enlarged diameters are realized by raising profile P in this region.

As can also be seen in FIG. 2, the flanks of the raised profiles of the first and second screw conveyor sections 10, 50 are brought into contact with the inwardly facing flanks of the end portions of support wheels 24, 26, 64, 66. By this means, screw conveyor sections 10, 50 can be additionally secured against axial displacement.

Figure 3:
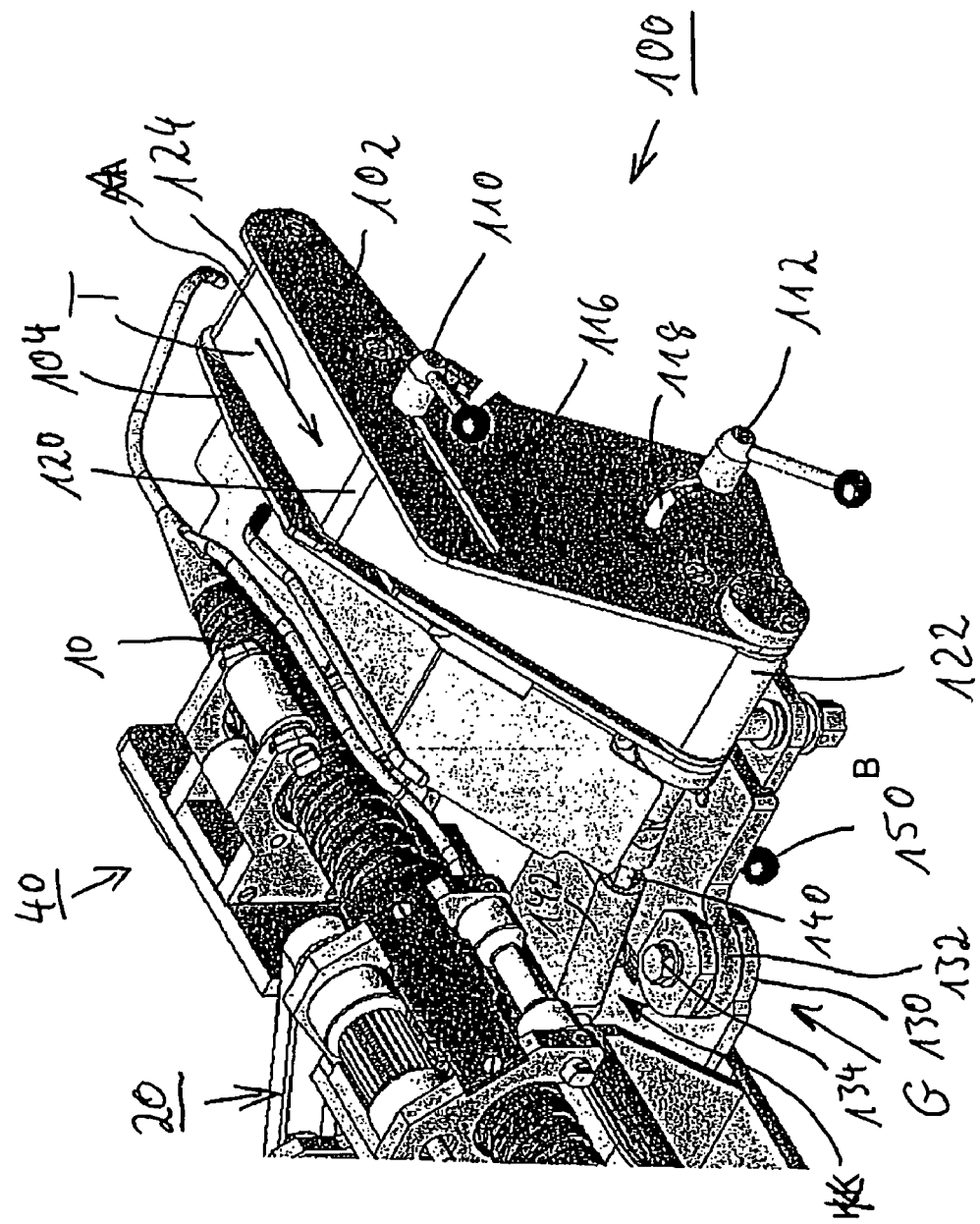
FIG. 3 shows one configuration of a pivotable run-out for the sausage products, in the closed, pivoted-in position.

A pivotable configuration of the run-out 100 for sausage products W, which was described in the foregoing with reference to FIG. 1, is shown in FIG. 3 in the closed, pivoted-in position, in other words, the position that run-out 100 is in during the production of sausage products.

As already described above, with reference to FIG. 1, run-out 100 is disposed alongside the first screw conveyor section 10 in such a way that the first, horizontal section of conveyor belt T is approximately aligned in height with the lower edge of the first screw conveyor section 10 and extends thereby from the end of the clipping machine to about as far as bearing assembly 40.

The left-hand and the right-hand vertical frame parts 102, 104 are arranged parallel to each other and in the direction of transport. The first and second rollers 120, 122 and a third roller 124 are disposed horizontally between them. Conveyor belt T runs around said rollers.

As can also be seen in FIG. 3, base platform B of run-out 100 is not fixedly connected to the machine frame, but is fixed thereto by means of an articulated joint G. Articulated joint G is formed by a first horizontal link plate 130 of the machine frame and a second horizontal link plate 132 of base B. Link plates 130, 132 have a bore disposed in their center, with which they are vertically aligned with each other, one above the other. A bolt 134, for example a screw, is arranged in the bores of link plates 130, 132 and joins link plates 130, 132 together in such a way that they can pivot in relation to each other about the longitudinal axis of bolt 134.

A locking mechanism, not shown in further detail in FIG. 3 and of which only the knob of adjusting handle 150 can be seen, is disposed underneath run-out 100 and allows run-out 100 to be released and locked in a desired position.

As likewise already mentioned, the second roller 122 can be driven via a Cardin shaft KK. Cardin shaft KK is connected to roller 122 via a Cardin joint, from which Cardin shaft KK is guided under the first screw conveyor section 10 to a suitable drive.

To enable run-out 100 to pivot, without having to separate Cardin shaft KK from roller 122, Cardin shaft KK is of alterable axial length. This is achieved by Cardin shaft KK having a first section 140 configured as a polygonal shaft. In the embodiment shown, the first section 140 has a regular hexagonal cross-section. However, it also may have any other polygonal shape.

The second section 142 of Cardin shaft KK is a hollow cylinder with an inner cross-section that corresponds to the cross-section of the first section 140. The first section 140 is axially displaceable within the second section 142, but forms a positive engagement with the latter, with the result that a torque can be transferred from one to the other section 140, 142.

However, it is also conceivable that the joint of Cardin shaft KK be disposed above and in the rotational axis of articulated joint G. This would obviate the need for a Cardin shaft of variable length.

The run-out shown in FIG. 3 can be pivoted horizontally away from the first screw conveyor section 10 by virtue of articulated joint G. However, the pivotable run-out 100 can also be retrofitted to existing discharge devices of clipping machines, in which case it may replace any non-pivotable run-out already in place in the discharge devices, for example.

Figure 4:
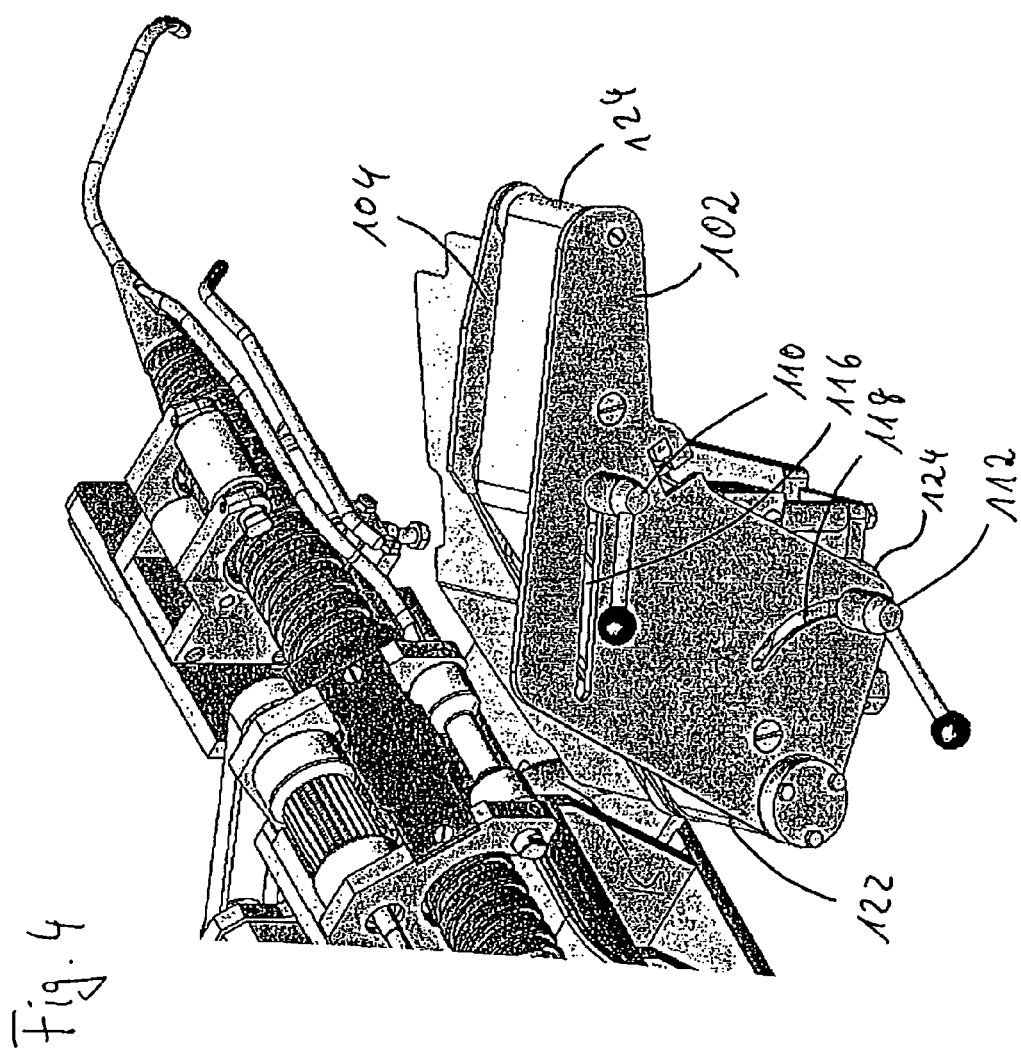
FIG. 4 shows the pivotable run-out for the sausage products, as shown in FIG. 3, in the open, pivoted-out position.

FIG. 4 shows run-out 100 in the open, pivoted-out position. It can be seen that the clipping-machine end of run-out 100 can be pivoted away from the clipping machine exit. This allows better access to the clipping machine, for example to carry out retrofitting or maintenance work.

The manner in which the inventive transport device operates as the discharge section of a clipping machine shall now be described with reference to the described embodiment. It should be noted, however, that the transport device according to the invention is not limited to this particular use.

Loop S is slid onto catching device F in a known manner immediately after attachment or even while it is being attached. For production-related reasons, sausage product W lies parallel to the discharge section on conveyor belt T and is removed by the latter from the immediate clipping machine area immediately after its completion. Loop S encircling catching device F continues to move along said mechanism until it has passed guide cone K and is located on the first screw conveyor section 10. As can be seen in FIG. 1, the horizontal section of conveyor belt T ends here and is followed by a downwardly sloping section. This also causes the sausage product to be moved out of its horizontal position on the driven conveyor belt T into a vertical position by freely suspending it by means of loop S from the first screw conveyor section 10. When sausage product W moves from the horizontal into the vertical position, guide rail 90 prevents any swinging movement on the part of sausage product W.

The drive means for conveyor belt T can be synchronized with the drive means of the clipping machine and screw conveyors 10, 50 in order to guarantee smooth discharge of sausage product W.

Depending on the caliber and/or the length of the sausage product W being made, and before production commences, the length of the first horizontal section of conveyor belt T is adjusted by means of adjusting handle 10 to the caliber and/or the length of sausage product W. This is done by firstly releasing adjusting handle 110 and moving the first roller 120 horizontally in elongate hole 116. Roller 120 is then locked in this position by means of adjusting handle 10. It can be seen clearly from FIGS. 3 and 4 that, by adjusting the length of the horizontal section of conveyor belt T, the gradient of the downwardly sloping second section of conveyor belt T is altered simultaneously.

Screw conveyor sections 10, 50 are actuated by a shared drive means that is not describe in further detail. The drive means transfers a drive torque onto the two drivable support wheels 26, 66, which are in positive engagement with screw conveyor sections 10, 50 and transfer the drive torque onto same. Due to the connection of the support wheels 26, 66 by shaft 70 having a Cardin joint, screw conveyor sections 10, 50 are driven synchronously, that is, at identical speeds.

Due to the rotational movement of screw conveyor sections 10, 50 and the resultant conveying motion of worm profiles P on the surface of screw conveyor sections 10, 50, the sausage product W suspended therefrom is moved along the direction of transport in the direction of transfer element UE.

Since loop S moves between two adjacent raised portions of worm profile P, its transportation is not impeded during movement of loop S through bearing units 20, 40, 60 by the support wheels 24, 26, 44, 64, 66 resting on the outer periphery of said profile.

When the left-hand end of the first screw conveyor section 10, as seen in FIG. 1, is reached, the sausage product W suspended on loop S is automatically transferred to the second screw conveyor section 50. The latter projects with its right-hand end into the left-hand end of the first screw conveyor section 10, thus avoiding any shoulder facing the direction of transport that could hinder the onward transport of sausage product W.

When sausage product W is located on the second, downwardly oriented screw conveyor section 50, it is conveyed further according to the rotational speed of the second screw conveyor section 50, which is equal to that of the first screw conveyor section 10. Since worm profile P extends over the entire length of screw conveyor sections 10, 50, sausage product W cannot slide forwards in an uncontrolled manner on the downwardly oriented screw conveyor section 50. Erratic transport and hindrances due to congestion are thus prevented.

When sausage product W reaches the left-hand end of the second screw conveyor section 50, it slides onto the fork-shaped transfer element UE, where it gets caught in a recess in the fork-shaped end. Sausage product W is removed from this position by known transfer elements, such as hooks moved on chain conveyors, and transported for further processing, for example for suspension on rods in smoking chambers.

The transport device according to the invention has been described above, with reference to the embodiment shown, as a discharge section 1 of a clipping machine. However, it may also be used in other applications in which products provided with suspension elements have to be transported. It may then be necessary to adapt the transition elements, such as guide cone K or transfer element UE, accordingly, or to replace them with suitable other transition elements.

Instead of the run-out 100 in FIG. 1 which is fixedly connected to the machine frame, a pivotable run-out 100 as shown in FIGS. 3 and 4 may also be provided. This can then be pivoted away from the clipping machine in the manner described above when production has ended, in order to clean or carry out maintenance work on the clipping machine. A pivotable run-out also makes it easier to carry out retrofitting or other adjustments to the clipping machine, which is then easier to access, before production begins.

It is equally possible, of course, to provide an articulated joint by means of which run-out 100 can be pivoted in a vertical plane. If run-out 100 can be pivoted downward, for example, this will facilitate access not only to the clipping machine, but also to screw conveyor sections 10, 50 and their respective drives and bearings.

Similarly, the uses of the transport device according to the invention are not limited to products which have loops as suspension elements. Appropriately shaped hooks or eyelets may likewise be used.

It is also possible to choose other orientations for screw conveyor sections 10, 50 than those shown. Due to positive guidance across the entire length of screw conveyor sections 10, 50, it is equally possible to realize transport via a screw conveyor section that has an upward gradient.

It is also possible, of course, to connect more than two screw conveyor sections to each other to form a transport device, thus allowing more than one change of direction, and the transport device to be designed and used in more flexible ways. Similarly, the design of the worm profile is similarly not restricted to the trapezoidal thread shown. Depending on the specific application, the worm profile can have a different cross-section, for example a sharp thread with different thread angles, or a different pitch.

The invention claimed is:

1. A transport device having a screw conveyor for transporting products hanging on loops comprising:
a first screw conveyor section;
a drive operatively connected to the first screw conveyor section wherein drive torque is transferred to said first screw conveyor section via an outer circumferential area of the first screw conveyor section;
a first bearing assembly supporting the first screw conveyor section;
a second screw conveyor section immediately adjoining the first screw conveyor section in the direction of transport; and
the first screw conveyor section and the second screw conveyor section are hollow shafts,
wherein a right-hand end of the second screw conveyor section is inserted into a left-hand end of the first screw conveyor section.

2. The transport device of claim 1, wherein a central longitudinal axis of the second screw conveyor section has an angular deviation with respect to a central longitudinal axis of the first screw conveyor section.

3. The transport device of claim 2, wherein the central longitudinal axis of the first and second screw conveyor sections are arranged in an at least approximately vertical plane.

4. The transport device of claim 2, wherein the angular deviation is less than 90°.

5. The transport device of claim 2, wherein the angular deviation may be in any direction different to the direction predefined by the central longitudinal axis of the first screw conveyor section.

6. The transport device of claim 1, wherein the first screw conveyor section includes a second bearing assembly.

7. The transport device of claim 6, wherein the second screw conveyor section includes at least one bearing assembly.

8. The transport device of claim 7, wherein the bearing assemblies of the first screw conveyor section and of the second screw conveyor section are each formed by three support wheels.

9. The transport device of claim 8 wherein the support wheels of each bearing assembly arranged at a uniform distance from each other in the circumferential direction of the screw conveyor sections.

10. The transport device of claim 1, wherein the second screw conveyor section is capable of being be driven.

11. The transport device of claim 10, wherein drive torque is transferred to the second screw conveyor section via an outer circumferential area thereof.

12. The transport device of claim 10, wherein the second screw conveyor section is driven in synchrony with the first screw conveyor section.

13. The transport device of claim 10, wherein the first and the second screw conveyor sections are jointly driven by the drive.

14. The transport device of claim 10, wherein drive torque is transferred to the first and to the second screw conveyor sections by a respective support wheel.

15. The transport device of claim 14, wherein each support wheel is in positive engagement with the first screw conveyor section and with the second screw conveyor section respectively.

16. The transport device of claim 14, wherein each support wheel frictional engages the first screw conveyor section and the second screw conveyor section respectively.

17. The transport device of claim 14, wherein the support wheels are connected by a Cardin shaft for synchronous transfer of the drive torque.

18. The transport device of claim 1, wherein the first and the second screw conveyor sections are disposed rotatably and coaxially on a first axle section and a second axle section respectively.

19. The transport device of claim 18, wherein the first and the second axle sections are fixedly connected to each other by a transition piece.

20. The transport device of claim 1, wherein feed and discharge guides for the loops are provided at infeed and discharge ends of the transport device, respectively.

21. The transport device of claim 1, wherein a run-out for the products is disposed in the region of the first screw conveyor section.

22. The transport device of claim 21, wherein the run-out has a drivable conveyor belt.

23. The transport device of claim 22, wherein a second section sloping downward in the direction of transport adjoins a first, horizontally oriented section of the conveyor belt.

24. The transport device of claim 21, wherein the run-out is connected to a machine frame pivotably in relation to the first and second screw conveyor sections by means of an articulated joint.

* * * * *

UNITED STATES PATENT AND TRADEMARK OFFICE
CERTIFICATE OF CORRECTION

Page 1 of 1

PATENT NO.       : 7,828,638 B2
APPLICATION NO.  : 12/408113
DATED            : November 9, 2010
INVENTOR(S)      : Manfred Waldstädt et al.

It is certified that error appears in the above-identified patent and that said Letters Patent is hereby corrected as shown below:

Column 12, Line 36, cancel the text beginning with "10. The transport device" to and ending "be driven." in column 12, line 37, and insert the following claim:
   --10. The transport device of claim 1, wherein the second screw conveyor section is capable of being driven.--

Signed and Sealed this
Twenty-third Day of August, 2011

David J. Kappos
*Director of the United States Patent and Trademark Office*